United States Patent
Zimmerli et al.

(10) Patent No.: US 11,807,495 B2
(45) Date of Patent: Nov. 7, 2023

(54) MEASURING DEVICE FOR MEASURING AN ELEVATOR SHAFT AND USE OF THE MEASURING DEVICE TO MEASURE AN ELEVATOR SHAFT

(71) Applicant: Inventio AG, Hergiswil (CH)

(72) Inventors: Philipp Zimmerli, Härkingen (CH); Raphael Bitzi, Lucerne (CH)

(73) Assignee: INVENTIO AG, Hergiswil (CH)

( * ) Notice: Subject to any disclaimer, the term of this patent is extended or adjusted under 35 U.S.C. 154(b) by 283 days.

(21) Appl. No.: 17/310,192

(22) PCT Filed: Mar. 2, 2020

(86) PCT No.: PCT/EP2020/055405
§ 371 (c)(1),
(2) Date: Jul. 26, 2021

(87) PCT Pub. No.: WO2020/178224
PCT Pub. Date: Sep. 10, 2020

(65) Prior Publication Data
US 2022/0162040 A1  May 26, 2022

(30) Foreign Application Priority Data
Mar. 5, 2019 (EP) .................................... 19160765

(51) Int. Cl.
*B66B 19/00* (2006.01)
*G01B 11/14* (2006.01)

(52) U.S. Cl.
CPC .............. *B66B 19/00* (2013.01); *G01B 11/14* (2013.01)

(58) Field of Classification Search
CPC ............................... B66B 19/00; G01B 11/14
See application file for complete search history.

(56) References Cited

U.S. PATENT DOCUMENTS 4,106,594 A * 8/1978 Kirsch .................... B66B 5/022
187/278
6,877,587 B2 * 4/2005 Kunz .................... B66B 1/3492
187/394

(Continued)

FOREIGN PATENT DOCUMENTS

CN   1218176 A   6/1999
CN   1772587 A   5/2006

(Continued)

*Primary Examiner* — Michael A Riegelman
(74) *Attorney, Agent, or Firm* — William J. Clemens; Shumaker, Loop & Kendrick, LLP (57) ABSTRACT

A measuring device for measuring an elevator shaft has two cable-like, elongate guide elements that extend in parallel with one another, a measuring platform and a lifting apparatus. Each of the guide elements is fixedly attached to an upper holding point and a lower holding point in the elevator shaft and is tensioned between the upper holding point and the lower holding point. The measuring platform has guide apparatuses that laterally support the measuring platform on the guide elements and guide the measuring platform parallel to the guide elements during a displacement movement in a displacement direction. The measuring platform has a distance measuring apparatus to measure lateral distances to the lateral walls of the elevator shaft. The lifting apparatus moves the measuring platform in the displacement direction.

15 Claims, 3 Drawing Sheets

(56) References Cited

U.S. PATENT DOCUMENTS

| | | | |
|---|---|---|---|
| 8,256,582 B2* | 9/2012 | Qiu | G01B 17/00 |
| | | | 187/394 |
| 9,890,019 B2* | 2/2018 | Kere | E04G 3/28 |
| 10,246,304 B2* | 4/2019 | Ahoniemi | B66B 7/062 |
| 10,315,887 B2* | 6/2019 | Kilpeläinen | B66B 7/023 |
| 10,408,608 B2* | 9/2019 | Kilpelainen | B66B 19/002 |
| 10,850,946 B2* | 12/2020 | Butler | B66B 19/002 |
| 2010/0309452 A1* | 12/2010 | Qiu | G01B 17/00 |
| | | | 356/3 |
| 2015/0107186 A1* | 4/2015 | Wilts | B66B 19/002 |
| | | | 52/741.1 |
| 2016/0016759 A1* | 1/2016 | Ahoniemi | B66B 7/062 |
| | | | 187/254 |
| 2016/0311659 A1* | 10/2016 | Mertala | E04G 3/246 |
| 2016/0332845 A1* | 11/2016 | Kere | E04G 3/28 |
| 2018/0172439 A1* | 6/2018 | Kilpelainen | G01B 11/272 |
| 2018/0215588 A1* | 8/2018 | Butler | B66B 7/024 |
| 2019/0106296 A1* | 4/2019 | Barneman | B66B 19/00 |
| 2019/0177120 A1* | 6/2019 | Studer | B66B 19/00 |
| 2021/0156666 A1* | 5/2021 | Cambruzzi | B66B 19/00 |
| 2022/0162040 A1* | 5/2022 | Zimmerli | G01B 11/14 |

FOREIGN PATENT DOCUMENTS

| | | |
|---|---|---|
| CN | 101466630 A | 6/2009 |
| CN | 101888964 A | 11/2010 |
| CN | 105358468 A | 2/2016 |
| CN | 107848767 A | 3/2018 |
| JP | H06206676 A | 7/1994 |
| JP | 2005098786 A | 4/2005 |
| JP | 2018054346 A | 4/2018 |
| WO | 2009073010 A1 | 6/2009 |
| WO | 2018041815 A1 | 3/2018 |

* cited by examiner

MEASURING DEVICE FOR MEASURING AN ELEVATOR SHAFT AND USE OF THE MEASURING DEVICE TO MEASURE AN ELEVATOR SHAFT

FIELD

The present invention relates to a measuring device, by means of which an elevator shaft can be measured. The invention also relates to the use of such a measuring device for measuring an elevator shaft.

BACKGROUND

An elevator system generally has an elevator shaft within which an elevator car and, if necessary, a counterweight can be displaced vertically.

When constructing a building or installing an elevator system in a building, it must regularly be ensured that the elevator shaft corresponds to geometric and/or construction specifications within specified tolerance ranges. For example, it should be checked that the walls of the elevator shaft extend vertically within acceptable tolerances, that a cross section of the elevator shaft along a height extension of the elevator shaft remains the same within acceptable tolerances, etc.

Accordingly, it may be necessary to precisely measure the elevator shaft during the construction of the building or before or during the installation of the elevator system.

Conventionally, for this purpose, cords, at the lower end of which a weight is attached and which are thus used as a plumb line, are often suspended vertically from an upper suspension point in the elevator shaft. At different heights, i.e. in the region of elevator shaft doors on different floors of the building, for example, lateral distances between these plumb lines and reference positions on the elevator shaft are then measured. For this purpose, a technician can, for example, manually apply a tape measure to a plumb line and then measure a distance to a reference position. However, such a conventional procedure is very labor-intensive and can take several hours or even days, in particular in the case of high elevators. It also requires accurate manual work and is therefore prone to errors.

Devices have been developed in order to be able to at least partially automate the measurement of an elevator shaft.

For example, JP 2005 098786 A describes a device for measuring the dimensions of an elevator shaft, in which a laser distance measuring device for measuring a distance in a horizontal plane is fastened to an elevator car and can be moved vertically through the elevator shaft together with the elevator car in order to be able to measure lateral distances at different height positions. However, in the case of such an approach it is necessary for the elevator system to already be fully installed. Before the elevator system is completed, there is neither the elevator car nor a drive to move the car through the elevator shaft.

WO 2009/073010 A1 describes methods and devices for monitoring elevator shafts. In this case, a platform can be displaced along the elevator shaft by means of a drive machine to be mounted previously in the elevator shaft, and a distance sensor can be used to measure a lateral distance between a point on the platform and a wall of the elevator shaft. An installation of such a device in an elevator shaft can, however, be relatively complex and/or measurement results relating to dimensions of the elevator shaft cannot be sufficiently precise in some cases.

US 2018/215588 A1, WO 2009/073010 A1 and JP 2018 054346 A also describe measuring devices for measuring an elevator shaft.

There may be, inter alia, a need for an alternative measuring device which can be used simply in an elevator shaft and/or by means of which the elevator shaft can be measured reliably and precisely and which in particular can be displaced safely in the elevator shaft. Furthermore, there may be a need for a possibility of using such a measuring device for measuring an elevator shaft.

SUMMARY

A need of this kind can be met by the subject matter according to any of the advantageous embodiments defined in the following description.

According to a first aspect of the invention, a measuring device for measuring an elevator shaft is proposed. The measuring device has two cable-like, elongate guide elements which extend in parallel with one another, a measuring platform and a lifting apparatus. Each of the guide elements is fixedly attached to an upper holding point and a lower holding point in the elevator shaft and is tensioned between the upper holding point and the lower holding point. The measuring platform has guide apparatuses which laterally support the measuring platform on the guide elements and guide the measuring platform parallel to the guide elements during a displacement movement in a displacement direction. The measuring platform has a distance measuring apparatus in order to measure lateral distances to the lateral walls of the elevator shaft. The lifting apparatus is configured to move the measuring platform in the displacement direction.

According to the invention, the guide apparatuses each have at least three rollers, which are arranged such that at least a first of the rollers rolls with the circumferential surface thereof along a first surface of one of the guide elements during the displacement movement, and at least a second of the rollers rolls with the circumferential surface thereof along a second surface of the same guide element, which is opposite the first surface, during the displacement movement.

According to a second aspect of the invention, a use of the measuring device according to an embodiment of the first aspect of the invention for measuring an elevator shaft is described.

Possible features and advantages of embodiments of the invention may be considered, inter alia and without limiting the invention, to be based upon the concepts and findings described below.

Embodiments of the measuring device proposed here are intended to make it possible to measure an elevator shaft which is under construction or has already been completed and in which an elevator system is not necessarily yet installed. For example, it should be possible to determine whether the lateral walls of the elevator shaft are oriented vertically in a desired precise manner and extend in parallel with one another or whether there are excessive deviations from a specified geometry, for example deviations beyond a tolerance of, for example, +/−25 mm, as a result of imperfections or inaccuracies during construction, for example. Such deviations can require costly corrective measures which, after suitable measurement of the elevator shaft, have to be conveyed to a building owner, for example.

The measurement of the elevator shaft should in this case be feasible with as little effort as possible and allow a high degree of automation. It should also be possible to obtain measurement results with a high degree of reliability and, at the same time, a high degree of precision in the centimeter range for this purpose.

For the measuring device proposed here, guide elements are to be fixedly tensioned within the elevator shaft between an upper holding point and a lower holding point.

The guide elements should in this case be elongate and cable-like. In other words, a guide element should be able to bear tensile loads with high forces and at most slightly change its length due to stretching. However, the guide element can be bendable transversely to the longitudinal extension thereof, even by low forces. The guide element can be a cable, a wire, a wire braid, a belt, a strap or the like. It is also possible for the guide element to also be rigid transversely to the longitudinal extension thereof. In this case, the guide element can be designed as a rail, for example.

The upper holding point and the lower holding point can be arranged, for example, on or in the region of a ceiling and on or in the region of a floor of the elevator shaft, i.e. at opposite ends of the elevator shaft. For example, fastening means used as holding points can be fastened on or in an elevator shaft ceiling, an elevator shaft floor or an elevator shaft wall. A guide element can be attached to the upper holding point at one end and to the lower holding point at an opposite end and then tensioned between the two holding points such that the guide element can only be displaced slightly transversely to the longitudinal extension thereof. In this case, the holding points are preferably positioned such that the guide element extends substantially perpendicularly, i.e. vertically. Adjacent guide elements in this case extend substantially in parallel with one another. In this case, "substantially" can be understood to mean, for example, that deviations from a vertical orientation or parallelism are so small that their influence on the measurement results supplied by the measuring device remains negligible. For example, depending on the length of the elevator shaft to be measured, a tolerance range of +/−5°, +/−3° or even just +/−1° or less may be acceptable.

In subsequent use of the measuring device, the described cable-like guide elements are intended to laterally guide the measuring platform of the measuring device during a displacement movement which is to take place substantially in a displacement direction parallel to the guide elements. In other words, the guide elements previously tensioned in the elevator shaft are intended to prevent the measuring platform from deviating excessively from an intended, usually straight and vertical displacement path through the elevator shaft. For this purpose, the measuring platform can be located between the two guide elements and supported on same.

For this purpose, the measuring platform has guide apparatuses, by means of which it is supported on the guide elements in the lateral direction while it is moved in the vertical displacement direction through the elevator shaft. The guide apparatuses can be fixedly attached to the measuring platform and positioned such that they mechanically contact the guide elements and can be moved along them, in particular can roll or slide along the guide elements. In this case, the support provided by the guide apparatuses can, for example, prevent lateral, i.e. substantially horizontal, oscillation of the measuring platform within the elevator shaft.

A lifting apparatus is used in order to be able to move the measuring platform in the displacement direction. The lifting apparatus can, for example, be mounted in the elevator shaft, for example on the ceiling, floor or a lateral wall of the elevator shaft. The lifting apparatus can then be operatively connected to the measuring platform, for example via a cable-like connecting element. The measuring platform can thus be displaced within the elevator shaft by the lifting apparatus moving the connecting element.

For example, a simple cable winch can be provided as the lifting apparatus. The cable winch can be fastened, for example, in an upper region of the elevator shaft, in particular to a ceiling of the elevator shaft. A cable of the winch can be attached to the measuring platform. By winding and unwinding the cable, the cable winch can then move the measuring platform vertically in or counter to the displacement direction.

The described arrangement of guide elements in the elevator shaft, a measuring platform guided on the guide elements and a lifting apparatus for vertically displacing the measuring platform can be constructed using relatively simple and thus inexpensive components. Such an arrangement can be installed in an elevator shaft simply and in particular with little special knowledge, and the elevator shaft can then be measured using the arrangement. In particular, the cable-like guide elements can also be mounted and tensioned within the elevator shaft with sufficient precision by personnel who have little training. The measuring platform can then be installed and then suitably interact with the guide elements such that the movement of the measuring platform along the guide elements is guided with sufficient precision. The lifting apparatus can be simply constructed and installed. In particular, a simple cable winch can be used as the lifting apparatus, as is often used in any case when installing an elevator system in an elevator shaft.

A distance measuring apparatus is provided on the measuring platform which is designed and installed as described. This distance measuring apparatus is configured to measure lateral distances, in particular to the lateral walls of the elevator shaft. In other words, the distance measuring apparatus can measure a distance between itself, or the measuring platform on which it is installed, and a lateral wall of the elevator shaft. Examples of possible distance measuring apparatuses and details regarding same are described below. Since lateral distances to the lateral walls of the elevator shaft are measured at different height positions along the elevator shaft, the elevator shaft can then be measured as a whole and, for example, conclusions can be drawn about a vertical orientation of the lateral walls thereof, about deviations from a parallelism of the lateral walls thereof, and/or about deviations from target specifications with regard to the geometry of the elevator shaft.

Rollers which are used as guide apparatuses are attached to the measuring platform. The rollers can be attached directly to the measuring platform or fixedly connected thereto, for example via struts, and can be arranged such that, when the measuring platform is arranged in a desired position, for example between the two guide elements, the circumferential surfaces of the rollers each come into contact with a surface of one of the guide elements. When the measuring platform is then displaced in the displacement direction by means of the lifting apparatus, the rollers can roll along the guide elements and thus guide the movement of the measuring platform in parallel with the guide elements. The use of easily rotatable rollers can in this case allow the measuring platform to be displaced with little resistance, such that the platform can be displaced by the lifting apparatus with little force.

Each of the guide apparatuses arranged on the measuring platform has three or more rollers, the various rollers being arranged such that they each roll with the circumferential surfaces thereof along a common guide element but contact the guide element from opposite sides. In other words, the plurality of rollers can accommodate the relevant guide element therebetween, which ensures permanent contact between the rollers and the guide element. This ensures reliable guidance of the measuring device, such that, for example, the measuring device is effectively prevented from striking a shaft wall. In this case the rollers do not need to be directly opposite one another with respect to the guide element, i.e. the rollers do not necessarily need to be arranged at the same height. Instead, although the rollers can be arranged on opposite sides of the vertically extending guide element, they can be offset with respect to one another in the vertical direction, i.e. they can be arranged at different heights. In the case of such guide apparatuses having a plurality of rollers, the measuring platform can be guided particularly reliably and securely along the guide elements.

According to one embodiment, at least one guide apparatus is arranged in each case on opposite sides of the measuring platform.

In other words, the measuring platform can have at least two guide apparatuses which, viewed in a horizontal view of the measuring platform, are arranged on the left-hand side and right-hand side of the measuring platform. By means of its guide apparatuses, the measuring platform located between the two guide elements can thus be supported on opposite sides on the two guide elements. As a result, stable guidance of the measuring platform during the vertical movement thereof through the elevator shaft can be achieved.

According to a specific embodiment, the circumferential surfaces of the rollers of the guide apparatuses can be concave.

In other words, the rollers can be used particularly efficiently as guide rollers, in that the circumferential surface thereof is not planar but is indented inward toward an axis of rotation of the relevant roller. A cross-sectional profile or a curvature of the concave circumferential surface can in this case be selected such that the guide element fits at least partially complementarily into the circumferential surface of the relevant roller and is thus guided by edges of the roller, which are formed on opposite sides of the roller in the axial direction. This makes it possible for the rollers, when they roll along one of the guide elements, to not only provide guidance in a direction orthogonal to the circumferential surface thereof, but also provide guidance parallel to the circumferential surface. Overall, this can improve the guidance of the measuring platform.

According to one embodiment, the guide elements can be at least partially formed using a non-metal material.

In other words, the guide elements do not need to consist of metal, or at least not entirely. In contrast to, for example, cables or straps, which act as suspension elements in an elevator system and have to withstand the high tensile loads, significantly lower tensile loads typically act on the guide elements. In particular, the guide elements only need to be tensioned such that lateral movements of the guide elements are limited to a tolerable amount. Accordingly, the guide elements do not necessarily need to be designed as steel cables, for example. Instead, it may be sufficient to form a guide element, for example, using a plastics material, a textile material or the like. Such guide elements made of non-metal material can be cost-effective in comparison with steel cables, for example, and/or have a significantly lower weight and thus be easier to transport and install.

According to one embodiment, the distance measuring apparatus can be configured to measure the lateral distances to the lateral walls of the elevator shaft in a contactless manner.

In other words, a device which can measure distances to adjacent lateral walls without mechanically contacting the walls can be used as the distance measuring apparatus. In this case, various contactless measurement technologies can be used. For example, a laser beam can be directed toward a lateral wall by means of a laser distance measuring device and the distance between the lateral wall and the measuring device can be inferred by means of time of flight measurements, measurements of phase shifts or similar measurements. Alternatively, for example, ultrasonic sensors can be used to transmit ultrasonic signals to the lateral wall and to infer the distance to be bridged by means of time of flight measurements or the like. Contactless measurement of the lateral distances can allow low-wear operation of the measuring device or at least of the distance measuring apparatus thereof.

In particular, according to one embodiment, the distance measuring apparatus can be configured to measure the lateral distances in different lateral directions.

In other words, the distance measuring apparatus can measure lateral distances not only to a single one of the walls of the elevator shaft, but preferably to a plurality of or even all of the walls of the elevator shaft. For this purpose, the distance measuring apparatus can have a plurality of measuring components which can measure distances in one of a plurality of lateral directions in each case. For example, four measuring components can be provided, each of which can measure a lateral distance to one of the four walls of an elevator shaft. Measurement directions of the measurement components can in this case be arranged at right angles relative to one another. Alternatively, the distance measuring apparatus can have a measuring component which can be oriented in different measuring directions. For example, the measurement component can be rotated about a vertical axis in order to be able to orient the component in different lateral directions and then to be able to measure lateral distances to opposite lateral walls.

According to one embodiment, the distance measuring apparatus can be designed, for example, as a laser distance measuring device and can be configured to measure the lateral distances by means of a laser beam which is rotatingly oriented in different directions in a horizontal plane.

In other words, a laser distance measuring device can be used as a distance measuring apparatus and the laser beam used by the laser distance measuring device for distance measurement can in this case be directed in different lateral directions toward the plurality of shaft walls surrounding the elevator shaft in order to measure a current lateral distance to the walls. The entire laser distance measuring device can in this case be rotated in a horizontal plane. Alternatively, a rotating mirror can be used to deflect the laser beam emitted by the laser distance measuring device in the various lateral directions. The use of a laser distance measuring device having a rotating laser beam can allow precise, contactless and reliable measurement of the elevator shaft.

According to one embodiment, the measuring device can further comprise a height measuring apparatus which is attached to the measuring platform and which is configured to measure a current height position of the measuring platform within the elevator shaft.

In other words, a measuring apparatus can be mounted on the measuring platform, which measuring apparatus is moved vertically through the elevator shaft together with the measuring platform. The measuring apparatus can thus determine the height at which the measuring platform is currently located within the elevator shaft. Accordingly, in order to measure the elevator shaft, the measuring platform can be moved vertically within the elevator shaft and both the lateral distances to the lateral walls of the elevator shaft and the current height position of the measuring platform can be measured at different positions. The desired information about dimensions or a geometry of the elevator shaft along the height extension thereof can then be derived from the collected measurement data. The height position of the measuring platform within the elevator shaft can in this case be determined using various technical methods.

For example, according to a specific embodiment, the height measuring apparatus can be configured to measure the current height position of the measuring platform by means of an air pressure measurement.

The air pressure typically decreases within an elevator shaft as the height increases. A measurement of the locally prevailing air pressure can thus allow a conclusion to be drawn about the current height position. In this case, however, it can be difficult to determine the current height position as an absolute value with a high degree of accuracy. However, it is usually possible to easily sort height positions relative to one another on the basis of the respective measured air pressures. In other words, as a result of an air pressure measurement also being carried out for each measurement of the lateral distances to the lateral walls, it is possible to subsequently reconstruct the spatial sequence in which the individual distance measurements were carried out along the elevator shaft. Accordingly, a profile, which for example represents the profile of the lateral walls, can be derived from the distance measurements. Air pressure measurements can generally be carried out using simple, inexpensive pressure sensors. Air pressure measurements can also be used in very high elevators having elevator shafts of, for example, 100 m or more to measure the current height position.

Alternatively, the current height position could also be measured using other technologies. For example, a laser distance measuring device could be used to measure a current distance of the measuring platform from a floor or ceiling of the elevator shaft. However, such an optical distance measurement can lead to problems if relatively large distances of, for example, more than 50 m are to be measured, for example due to an absorption of light from the laser beam used for this purpose by dust particles within the elevator shaft volume to be measured.

According to one embodiment, the measuring device can furthermore have an acceleration sensor which is attached to the measuring platform and which is configured to measure accelerations acting on the measuring platform.

In other words, a sensor can be attached to the measuring platform that moves together with the measuring platform and is able to determine accelerations acting thereon. Such an acceleration sensor can typically measure accelerations in one, two or three spatial directions. By measuring the accelerations acting on the measuring platform, conclusions can be drawn, for example, about a current inclination of the measuring platform, about displacements of the measuring platform and/or about vibrations of the measuring platform. Taking information relating thereto into account, measurement results of the distance measuring apparatus can then be interpreted with greater accuracy, for example. In particular, influences on the measurements of the lateral distances to the lateral walls of the elevator shaft, as can be caused, for example, by movements of the measuring platform and the distance measuring apparatus attached thereto during the measuring process, can be taken into account in the interpretation of the measurements and can be calculated or compensated, for example.

According to one embodiment, the measuring device can furthermore have a plumb line hanging freely in the elevator shaft. In this case, the distance measuring apparatus can additionally be configured to measure a lateral distance to the plumb line.

In other words, together with the previously described components of the measuring device, a plumb line, i.e. a cord-like component weighted with a weight at the lower end thereof, can be installed in the elevator shaft. In contrast to the guide elements of the measuring device, which are fastened at the lower ends thereof to lower holding points inside the elevator shaft and are tensioned with respect to these, the plumb line is to be installed so as to hang freely in the elevator shaft. The plumb line can therefore indicate the vertical direction as a reference, due to the gravity acting thereon. The distance measuring apparatus provided on the measuring platform of the measuring device can then be configured to not only measure the lateral distances to the lateral walls of the elevator shaft, but also to measure a lateral distance to the plumb line. The latter measured distance can then be used to calibrate the measurement of the lateral distances. This can be necessary in particular if the guide elements do not extend perfectly vertically within the elevator shaft.

Accordingly, by calibrating the measured lateral distances to the lateral walls, taking into account the lateral distance to the plumb line, it is possible to detect if, for example, the guide elements in the elevator shaft have not been tensioned vertically. Furthermore, it is also possible, for example, to detect if, although the entire elevator shaft is straight per se and the guide elements have been tensioned perfectly parallel to the lateral walls of the elevator shaft, the elevator shaft is slightly inclined overall with respect to the vertical.

According to a specific embodiment, the distance measuring apparatus can have a laser distance measuring device for measuring the lateral distance to the plumb line.

By means of such a laser distance measuring device, the lateral distance to the plumb line can be determined with a high degree of precision. For this purpose, a laser beam emitted by the laser distance measuring device can be directed horizontally to the plumb line and the lateral distance to the plumb line can be inferred, for example, by means of a time of flight measurement or based on a phase shift. In principle, the laser distance measuring device can be the same device which the lateral distances to the lateral walls of the elevator shaft can also be measured. However, it may be preferable to provide a second laser distance measuring device, which is separate from the first laser distance measuring device, for measuring the lateral distance to the plumb line, for example because this second laser distance measuring device can be designed for measuring shorter distances than is the case for measuring the lateral distances to the lateral walls. Accordingly, the distance measuring apparatus can optionally have two separate laser distance measuring devices. The second laser distance measuring device in particular has a higher degree of accuracy than the first laser distance measuring device. The second laser distance measuring device is in particular designed as what is referred to as a 2D laser scanner, by means of which a vertical and a lateral distance between the laser distance measuring device and the plumb line can be measured.

According to the second aspect of the invention, embodiments of the measuring device described herein can be used to measure an elevator shaft. For this purpose, the measuring device can be installed inside the elevator shaft. In the case of such an installation, the guide elements can be attached to the upper and lower holding points and then tensioned therebetween. In addition, the lifting apparatus can be installed in the elevator shaft. The measuring platform can then be connected to the lifting apparatus, and the guide apparatuses of the measuring platform can be brought into supporting contact with the previously installed guide elements. After such an installation of the measuring device, the measuring platform can be moved to different height positions within the elevator shaft by means of the lifting apparatus, and a measurement of the lateral distances to the lateral walls of the elevator shaft can be carried out at each of the height positions. The current height position can optionally also be determined and stored for each such measurement. The geometry of the elevator shaft can then be inferred from the collected measurement data.

It should be noted that some of the possible features and advantages of the invention are described herein with reference to different embodiments of the measuring device for measuring an elevator shaft and of the use of such a measuring device. A person skilled in the art will recognize that the features may be combined, adapted or replaced as appropriate in order to arrive at further embodiments of the invention.

Embodiments of the invention are described below with reference to the accompanying drawings, with neither the drawings nor the description being intended to be interpreted as limiting the invention.

The drawings are merely schematic and not to scale. Like reference signs denote like or equivalent features in the various drawings.

DETAILED DESCRIPTION

Figure 1:
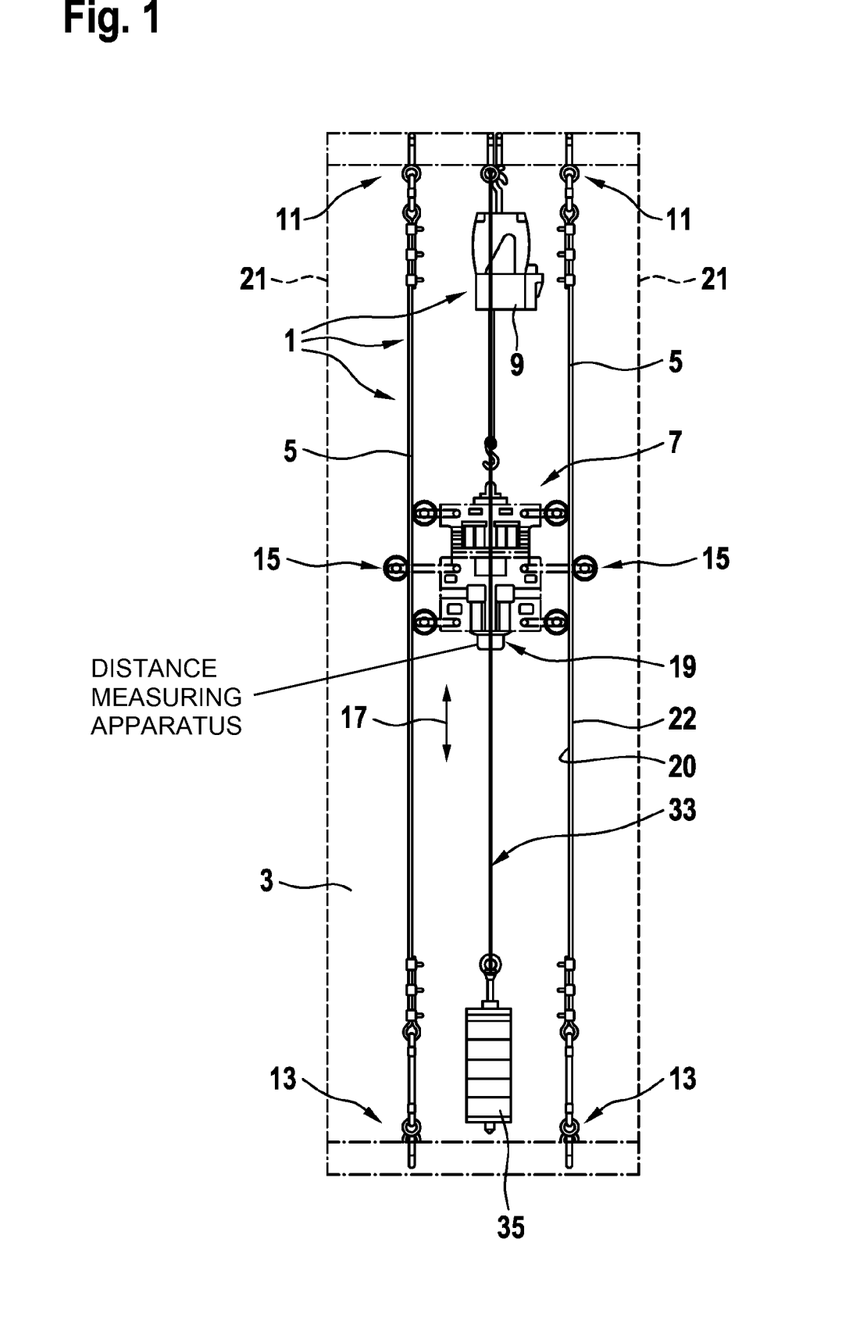
FIG. 1 shows a measuring device for measuring an elevator shaft according to an embodiment of the present invention.

FIG. 1 shows an embodiment of a measuring device 1 by means of which an elevator shaft 3 delimited by lateral walls 21 can be measured. The measuring device 1 can in particular be installed quickly and easily in an elevator shaft 3 which has not yet been completed, i.e. as long as the elevator shaft is in the state of a construction site. A profile of the elevator shaft 3 can then be determined in a simple and quick manner by means of the measuring device 1. A profile can in this case be understood to be, for example, how oblique the elevator shaft 3 is relative to a plumb line.

The measuring device 1 has two cable-like, elongate guide elements 5 which extend in parallel with one another. The guide elements 5 are each attached at opposite ends thereof to an upper holding point 11 and a lower holding point 13 and are tensioned between the two holding points 11, 13. In the example shown, the upper holding points 11 can be anchored in a ceiling of the elevator shaft 3, whereas the lower holding points 13 can be anchored to a floor of the elevator shaft 3. The cable-like guide elements 5 are in this case preferably installed and tensioned in such a way that they extend substantially perpendicularly, i.e. vertically.

A measuring platform 7 is then used between the guide elements 5 installed in this way. A plurality of guide apparatuses 15 are provided on the measuring platform 7, by means of which the measuring platform 7 can be supported laterally on the guide elements 5 and the measuring platform 7 can be guided parallel to the guide elements 5 during a displacement movement in an in particular vertically extending displacement direction 17.

In addition, a lifting apparatus 9 is installed in the elevator shaft 3, by means of which the measuring platform 7 can be moved in the displacement direction 17. In the example shown, the lifting apparatus 9 is designed as a cable winch and is anchored to the ceiling of the elevator shaft 3. A cable of the cable winch engages in an eyelet attached to the measuring platform 7. By winding or unwinding the cable, the measuring platform 7 can then be raised or lowered in the displacement direction 17 in the elevator shaft 3 and is guided by its guide apparatuses 15 on the guide elements 5.

A distance measuring apparatus 19 is attached to the measuring platform 7. Lateral distances to the lateral walls 21 of the elevator shaft 3 can be measured by means of the distance measuring apparatus 19.

A plumb line 33 is also provided in the elevator shaft 3. A cord-like component of this plumb line 33 is anchored at the top in the ceiling of the elevator shaft 3 and is weighted with a weight 35 at the lower end thereof.

Figure 2:
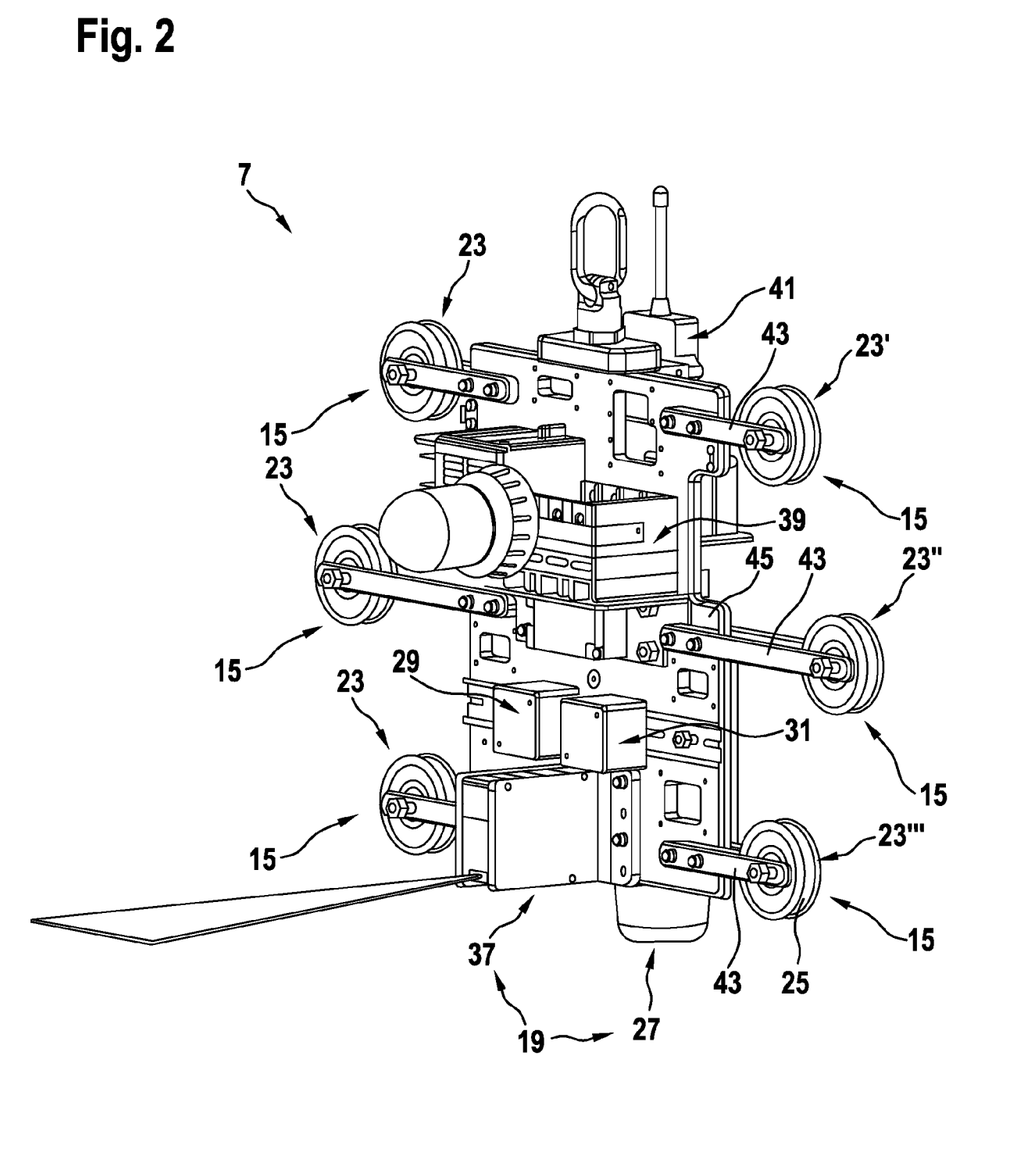
FIG. 2 is a perspective front view of a measuring platform for a measuring device according to an embodiment of the present invention.
Figure 3:
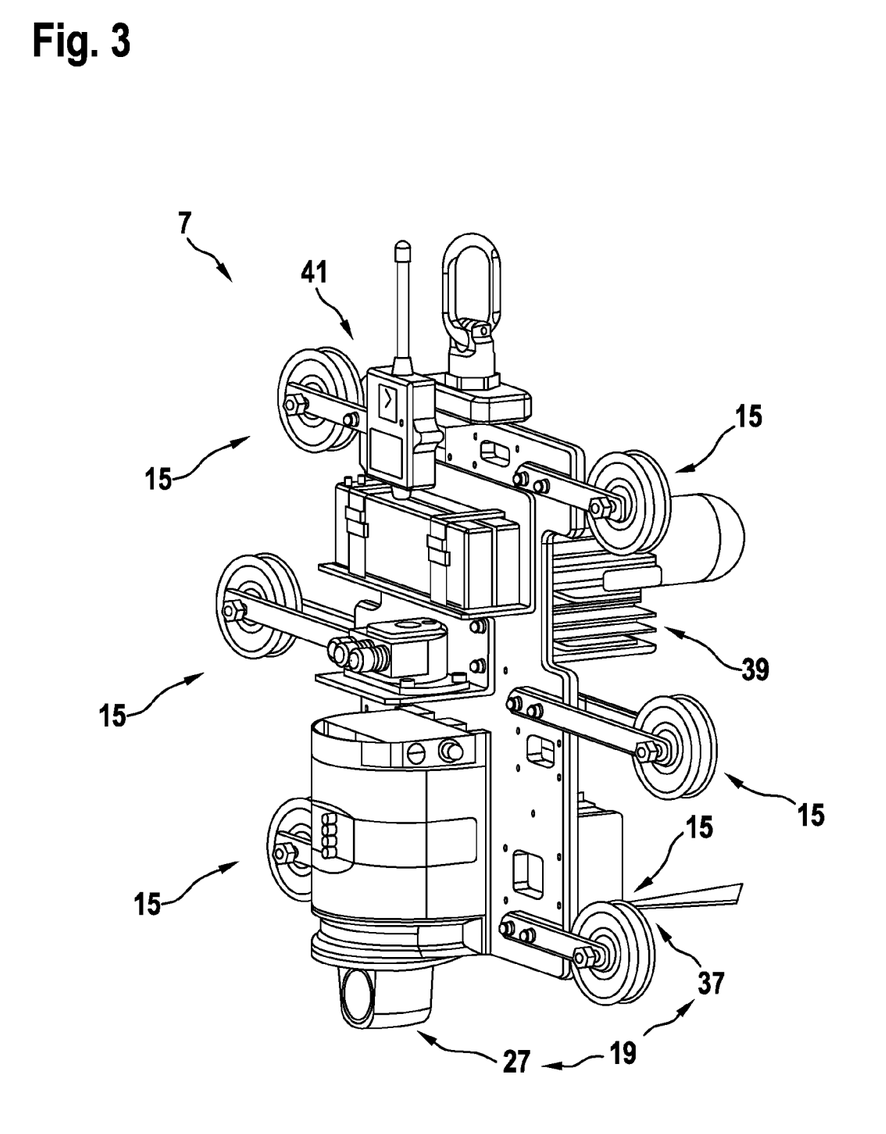
FIG. 3 is a perspective rear view of the measuring platform from FIG. 2.

FIGS. 2 and 3 are specific views of an embodiment of the measuring platform 7 of the measuring device 1.

In the embodiment shown, a guide apparatus 15 is arranged in each case on opposite sides of the measuring platform 7. Each of the guide apparatuses 15 in this case has three rollers 23 which are attached to a central body 45 of the measuring platform 7 via horizontally extending struts 43.

The three rollers 23 are in this case arranged at different lateral distances in relation to the central body 45. An uppermost roller 23' and a lowermost roller 23''' are arranged closer to the central body 45 than a middle roller 23'' located vertically therebetween. As a result, the three rollers 23 are arranged such that the uppermost roller 23' and the lowermost roller 23''' roll with the circumferential surface 25 thereof on a first surface 20 (see FIG. 1) of a guide element 5 (not shown in FIGS. 2 and 3) that is directed toward the central body 45 during the displacement movement, whereas the middle roller 23'' rolls along a second, opposite surface 22 (see FIG. 1) of the guide element 5 that is directed away from the central body 45. The various rollers 23 of a guide apparatus 15 thus accommodate the cable-like, tensioned guide element 5 therebetween and can thus ensure reliable guidance of the measuring platform 7 along the guide element 5.

In addition, the circumferential surfaces 25 of the rollers 23 are concave, such that the measuring platform 7 can be guided not only in a plane defined by the guide apparatuses 15, but also transversely to the plane.

In the embodiment shown, the distance measuring apparatus 19 is designed having a first laser distance measuring device 27 and a second laser distance measuring device 37.

The first laser distance measuring device 27, as a rotating 2D laser, is configured to emit a laser beam in a rotating manner in a horizontal plane in different directions and to measure lateral distances to at least one of the lateral walls 21 (see FIG. 1) of the elevator shaft 3 by means of the laser beam. By means of this first laser distance measuring device 27, a cross section of the elevator shaft 3, for example, can be measured at different height positions.

The second laser distance measuring device 37, which to be only optionally provided, can be used to measure a lateral distance to the plumb line 33 (see FIG. 1), in order to be able to use this measured value to calibrate the measured values determined by the first laser distance measuring device 27 or to compensate for errors of the measuring device, for example. In particular, the measured values determined by the second laser distance measuring device 37 can be used to determine how precisely the guide elements 5 are in the perpendicular. The second laser distance measuring device 37 is in particular designed as a 2D laser scanner.

The measuring platform 7 also has a height measuring apparatus 29, by means of which a current height position of the measuring platform 7 within the elevator shaft 3 can be measured. The height measuring apparatus 29 can in particular have an air pressure sensor, by means of which a locally prevailing air pressure can be measured and a current height position can be inferred from the measured air pressure.

In addition, an acceleration sensor 31 is provided on the measuring platform 7, by means of which accelerations that act on the measuring platform 7 can be measured. As a result, for example, vibrations or displacements of the measuring platform 7 can be measured in order to be able to interpret the measuring results of the distance measuring apparatus 19 of the platform even better.

In order to be able to measure the elevator shaft 3 using the measuring device 1, the measuring platform 7 of the previously completely installed measuring device 1 can be moved to different height positions within the elevator shaft 3. Lateral distances to one or more of the lateral walls 21 of the elevator shaft 3 can then be measured at each of the height positions by means of the distance measuring apparatus 19. Cross sections of the elevator shaft 3, for example, can be determined from such measurements, which cross sections can, for example, be superimposed during a data evaluation such that the guide elements 5 or the measuring platform 7 always come to rest at the same horizontal location. In this way, relative deviations from cross section to cross section can be determined.

Operation of the measuring platform 7 and the components arranged thereon, in particular the distance measuring apparatus 19 together with the first and second laser distance measuring devices 27, 37, the height measuring apparatus 29 and the acceleration sensor 31 thereof, can in this case be controlled or coordinated by a control unit 39. Determined measurement results can optionally be transmitted via a data transmission unit 41, for example wirelessly, to an external evaluation unit (not shown).

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A measuring device for measuring an elevator shaft, the measuring device comprising:

two elongate guide elements extending in parallel with one another vertically in the elevator shaft, each of the guide elements being fixedly attached to an upper holding point and a lower holding point in the elevator shaft and being tensioned between the upper holding point and the lower holding point;

a measuring platform positioned in the elevator shaft, the measuring platform having guide apparatuses that laterally support the measuring platform on the guide elements and guide the measuring platform parallel to the guide elements during a displacement movement of the measuring platform in a displacement direction in the elevator shaft;

a lifting apparatus installed in the elevator shaft and attached to the measuring platform, the lifting apparatus being adapted to move the measuring platform in the displacement direction during the displacement movement;

wherein the measuring platform has a distance measuring apparatus for measuring lateral distances to lateral walls of the elevator shaft; and wherein the guide apparatuses each have at least three rollers arranged such that a first of the at least three rollers has a circumferential surface that rolls along a first surface of one of the guide elements during the displacement movement, and a second of the at least three rollers has a circumferential surface that rolls along a second surface of the one guide element, the second surface being opposite the first surface, during the displacement movement.

2. The measuring device according to claim 1 wherein at least one of the guide apparatuses is arranged on one side of the measuring platform and another of the guide apparatuses is arranged on an opposite side of the measuring platform.

3. The measuring device according to claim 1 wherein the circumferential surfaces of the first roller and the second roller are concave.

4. The measuring device according to claim 1 wherein the guide elements are at least partially formed of a non-metal material.

5. The measuring device according to claim 1 wherein the distance measuring apparatus measures the lateral distances contactlessly.

6. The measuring device according to claim 1 wherein the distance measuring apparatus measures the lateral distances in at least two different lateral directions.

7. The measuring device according to claim 1 wherein the distance measuring apparatus includes a laser distance measuring device and measures the lateral distances using a laser beam rotatingly oriented in a plurality of directions in a horizontal plane.

8. The measuring device according to claim 1 including a height measuring apparatus attached to the measuring platform and adapted to measure a current height position of the measuring platform within the elevator shaft.

9. The measuring device according to claim 8 wherein the height measuring apparatus measures the current height position of the measuring platform by an air pressure measurement.

10. The measuring device according to claim 1 including an acceleration sensor attached to the measuring platform and adapted to measure accelerations acting on the measuring platform.

11. The measuring device according to claim 1 including a plumb line hanging freely in the elevator shaft, wherein the distance measuring apparatus measures a lateral distance to the plumb line.

12. The measuring device according to claim 11 wherein the distance measuring apparatus includes a laser distance measuring device that measures the lateral distance to the plumb line.

13. A method of measuring an elevator, the method comprising the steps of:
 installing the measuring device according to claim 1 in the elevator shaft;
 operating the lifting apparatus to move the measuring platform in the displacement direction; and
 operating the distance measuring apparatus of the platform to measure lateral distances to lateral walls of the elevator shaft.

14. The method according to claim 13 including transmitting determined measurement results representing the measured lateral distances to an external evaluation unit.

15. A measuring device for measuring an elevator shaft, the measuring device comprising:
 two elongate guide elements extending in parallel with one another vertically in the elevator shaft, each of the guide elements being fixedly attached to an upper holding point and a lower holding point in the elevator shaft and being tensioned between the upper holding point and the lower holding point;
 a measuring platform positioned in the elevator shaft, the measuring platform having guide apparatuses that laterally support the measuring platform on the guide elements and guide the measuring platform parallel to the guide elements during a displacement movement of the measuring platform in a displacement direction in the elevator shaft;
 a lifting apparatus installed in the elevator shaft and attached to the measuring platform, the lifting apparatus being adapted to move the measuring platform in the displacement direction during the displacement movement;
 wherein the measuring platform has a distance measuring apparatus for measuring lateral distances to lateral walls of the elevator shaft;
 wherein the guide apparatuses each have at least three rollers arranged such that a first of the at least three rollers has a circumferential surface that rolls along a first surface of one of the guide elements during the displacement movement, and a second of the at least three rollers has a circumferential surface that rolls along a second surface of the one guide element, the second surface being opposite the first surface, during the displacement movement;
 wherein the distance measuring apparatus includes a first laser distance measuring device and measures the lateral distances using a laser beam rotatingly oriented in different directions in a horizontal plane;
 a height measuring apparatus attached to the measuring platform and adapted to measure a current height position of the measuring platform within the elevator shaft;
 an acceleration sensor attached to the measuring platform and adapted to measure accelerations acting on the measuring platform;
 a plumb line hanging freely in the elevator shaft, wherein the distance measuring apparatus includes a second laser distance measuring device that measures a lateral distance to the plumb line; and
 a control unit connected to and controlling operations of the first laser distance measuring device, the height measuring apparatus, the acceleration sensor and the second laser distance measuring device.

\* \* \* \* \*